United States Patent [19]
Lascelles et al.

[11] 4,009,650
[45] Mar. 1, 1977

[54] FRUIT PITTING MACHINE

[75] Inventors: Daniel J. Lascelles, Deland; Dexter Spear French, Jr., Longwood, both of Fla.

[73] Assignee: Dunkley Company, Kalamazoo, Mich.

[22] Filed: Sept. 22, 1975

[21] Appl. No.: 615,602

[52] U.S. Cl. .................................. 99/490; 99/561; 99/565; 209/74 M

[51] Int. Cl.² .......................................... A23N 3/00

[58] Field of Search ............ 99/489, 490, 547, 559, 99/560, 561, 565; 209/74 M

[56] References Cited
UNITED STATES PATENTS

| | | | |
|---|---|---|---|
| 2,205,397 | 6/1940 | Drake | 99/490 |
| 2,232,207 | 2/1941 | Carroll | 99/490 |
| 2,238,980 | 4/1941 | Metcalf | 99/490 |
| 2,298,613 | 10/1942 | Carroll | 99/490 |
| 2,547,207 | 4/1951 | Harworth | 99/490 |
| 3,817,168 | 6/1974 | Maytum | 99/490 |
| 3,910,416 | 10/1975 | Payne | 209/74 M |

*Primary Examiner*—Billy J. Wilhite
*Attorney, Agent, or Firm*—Duckworth, Hobby, Orman, Allen, & Pettis

[57] ABSTRACT

A fruit pitting machine apparatus for separating unpitted fruit from pitted fruit having pitting needles which force fruit pits through a pair of springloaded jaws. As a pit is forced through the jaws a pneumatic valve actuates a pneumatic pressure switch which generates electric signals in an electrical memory. If the jaws are not actuated by a pit being forced therethrough an air ejector will eject the unpitted fruit into a separate container following a predetermined positional relay for aligning the unpitted fruit with the ejector.

15 Claims, 8 Drawing Figures

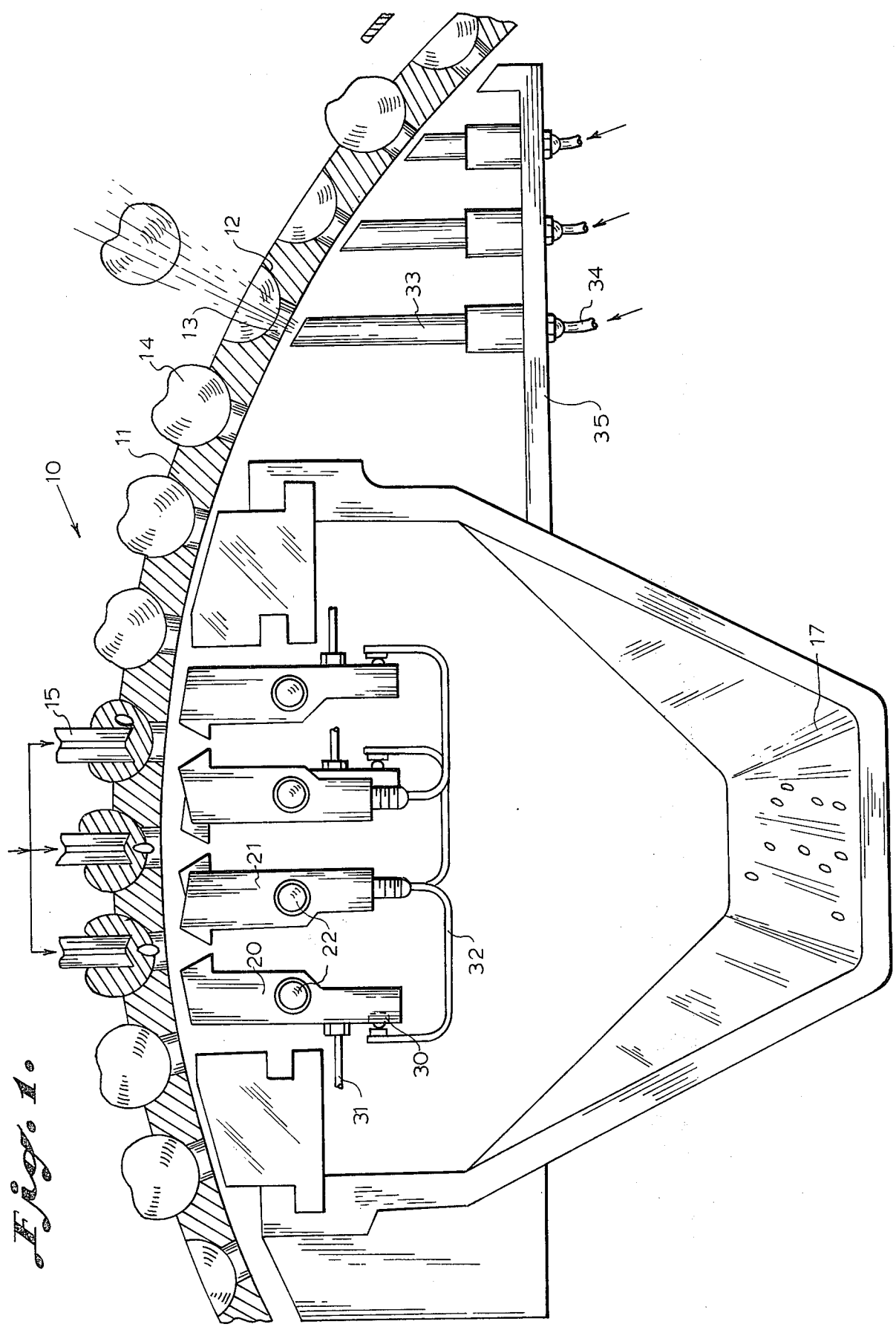

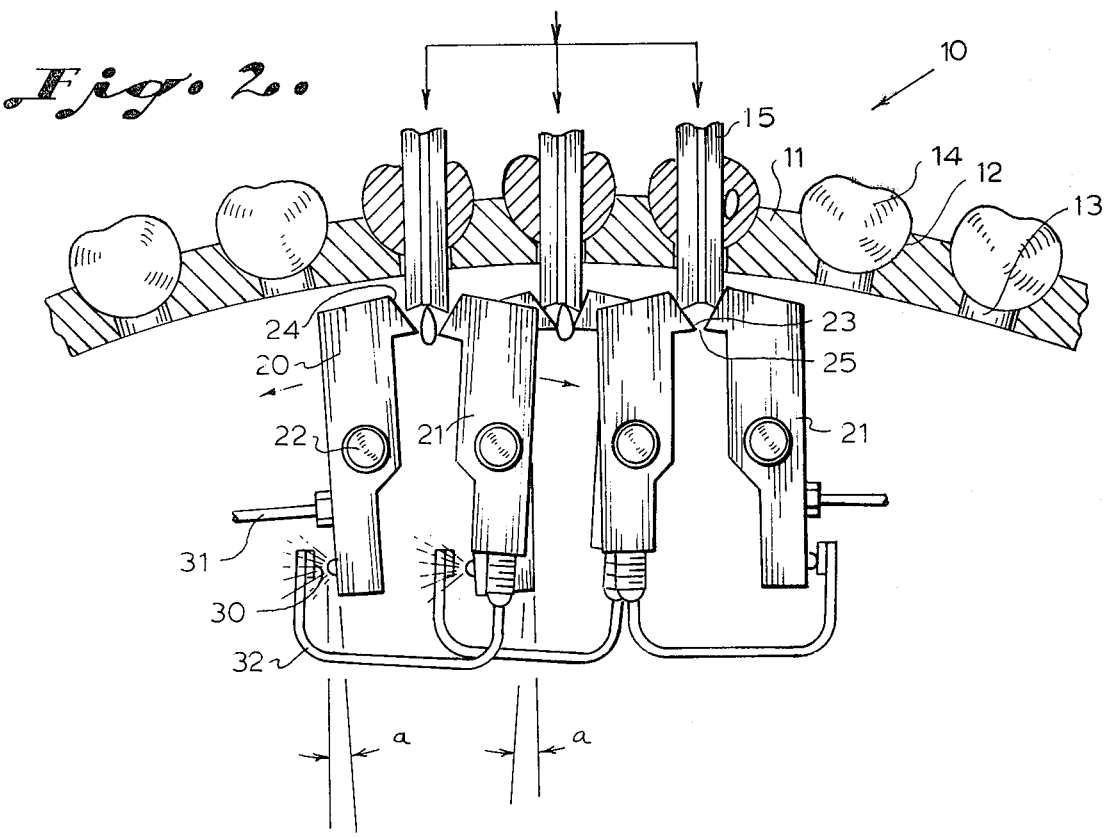
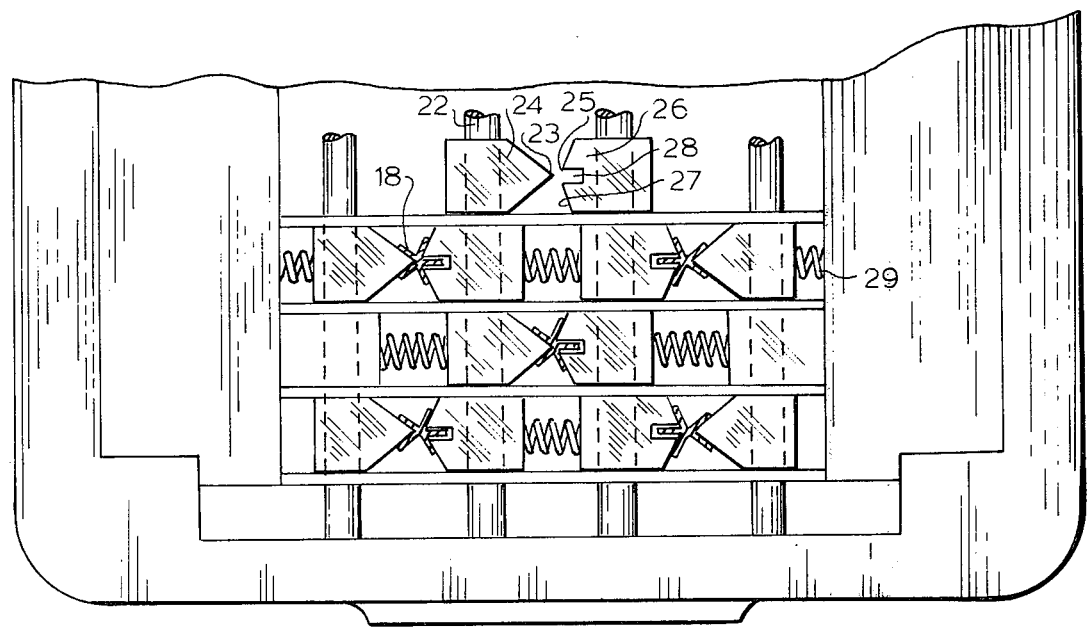

FRUIT PITTING MACHINE

BACKGROUND OF THE INVENTION

The present machine relates to fruit pitting machines and especially to a cherry pitting machines adapted to separate unpitted fruit from pitted fruit following a removal of pits from the fruit.

In the past, a great variety of fruit pitting machines have been designed to remove the pits automatically from such fruits as cherries, peaches, olives, and the like. In the typical cherry pitting machine, the fruit is held in an individual cup having an opening in the bottom. One or more rows of fruit are synchonized with a plurality of needles or knife blades shaped to remove the pit from the fruit. The rows of cherries are aligned with the needles which are then thrust through the cherries driving the pits from the cherries. The needles are then retracted and the cherries with the pits removed are dumped into a container for further processing. Machines of this type typically have a small percentage of the cherries left with pits therein, such as when the pits are located to one side of the fruit or the fruit is positioned so that the pit removing needle does not remove the pit. Cherries are then graded according to the number of pits remaining in the final batch of cherries which have been processed through the cherry pitting machines and command higher prices for higher grades. It has been suggested to improve the quality of the cherries being processed by virtually eliminating any cherries having pits in the finished processed cherry products. A typical fruit pitting machine of this type can be seen in the Maytum U.S. Pat. No. 3,817,168 in which a sonic transducer senses the pit being driven from the fruit and generates an electrical signal if a pit is not removed from the piece of fruit which signal then allows an ejector nozzle to blow the unpitted fruit from the conveyor. It has also been suggested in the past to utilize an optical reader to determine whether a pit has been removed from pitted fruit by placing a photo diode or transistor in alignment with a light emitting diode whose beam is in the path of the pits as they pass from the fruit and then eject any fruit in which a signal has not been received by a pit being removed from the fruit.

The present invention relates to a pitting machine in which unpitted fruit is separated utilizing reliable mechanical jaws which actuate pneumatic valves which operate an electrical memory which in turn operate other fluid valves for ejecting unpitted fruit at the appropriate index point.

SUMMARY OF THE INVENTION

A fruit pitting machine is provided having a fruit conveyor along with a pitting system for removing pits from pit containing fruit. The pitting system includes a plurality of needles of predetermined shape and located on one side of a fruit conveyor for driving fruit pits from the fruit through an opening in the fruit conveyor. Springloaded movable jaws are located on the other side of the fruit conveyor and are shaped to receive the pit removing needle without moving the jaws but to separate the jaws by the camming action of the pit hitting against portions thereof. A separating nozzle is fluid actuated for ejecting unpitted fruit, and a delay control electrical circuit is coupled to the separating ejector system for selectively actuating the separating system following a predetermined delay responsive to the absence of the jaws movement by the fruit pit.

BRIEF DESCRIPTION OF THE DRAWINGS

Other objects and features and advantages of the present invention will be apparent from the written description and the drawings in which:

FIG. 1 is a side sectional view of a fruit pitting machine according to the present invention;

FIG. 2 is a sectional view of a fruit pitting machine with the pits being ejected from the fruit;

FIG. 3 is a top sectional view of fruit pitting machine showing the alignment of a fruit pit ejector needle with springloaded jaws;

DESCRIPTION OF THE PREFERRED EMBODIMENTS

Figure 4:
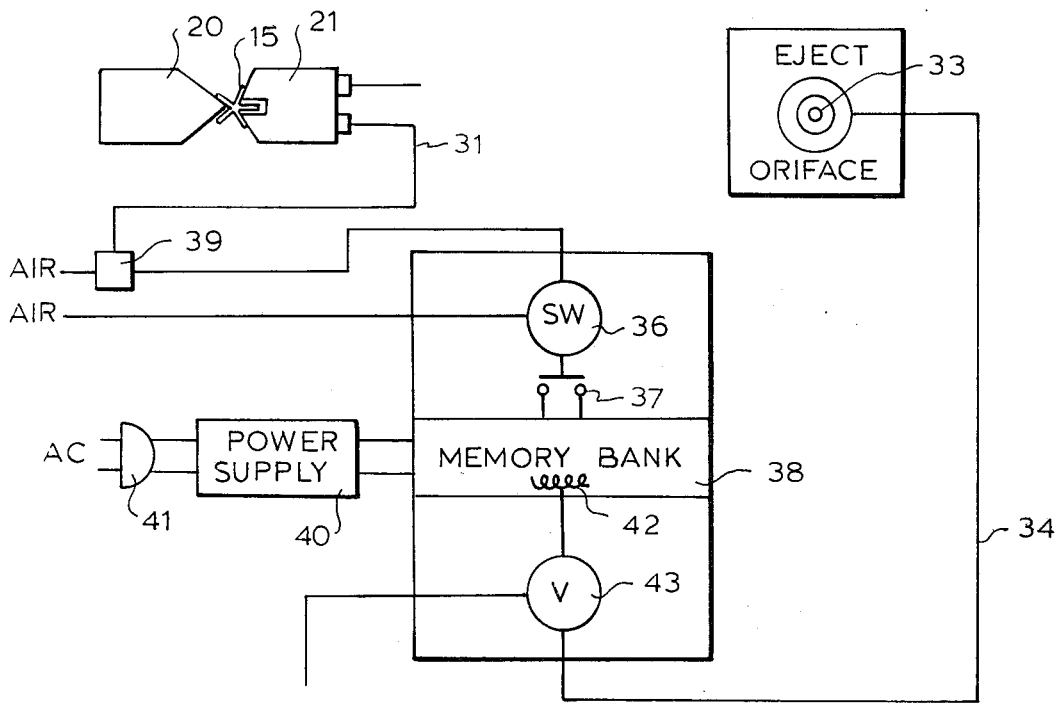
FIG. 4 is a diagrammatic drawing illustrating the operation of the unpitted fruit separating system.

Referring to FIGS. 1 through 3 of the drawings a fruit pitting machine is illustrated having a conveyor drum 11 having a plurality of rows of fruit holding cups 12 each having an opening 13 in the bottom thereof. The cups 12 hold cherries or other fruit 14 and are moved along as the drum 11 rotates in a stepped sequence aligning three rows of cherries with three rows of elongated pit removing needles 15. The rotating conveyor 11 is stopped in position momentarily while the needles 15 simultaneously drive the pits 16 from the cherries 14 through the openings 13 and onto a chute 17 from which the pits are removed from the machine. The cherries 14 with the pits 16 removed can then be shifted on the drum conveyor 11 until they are dropped into a container for further processing. It should be noted that the needles 15 have a plurality of blades 18 which extend radially from the center axis to form a general star shape. The tips of the blades 18 are angled so as to assure engaging the pit as the needle is driven through the fruit. In the present machine, a pair of jaws 20 and 21 are springloaded by springs 29 and are movalbe mounted to shafts 22 beneath each needle 15 so that each needle will be driven into the jaws 20 and 21 and each pit 16 will be driven through the jaws. Jaws 20 and 21 have a pair of upper camming surfaces with the jaw 20 having a pointed end 23 with a downwardly sloping portion 24 and having a space 25 between the jaw 20 and the jaw 21. The jaw 21 has a downwardly angled surface 26 as well as being pointed by angled surfaces 27 but with a slot 28 replacing the apex of the angles 27. The spacing 25 along with the special camming portion of the jaws 20 and 21 having the downward angles 24 of cam 20 and 26 of cam 21 allows the pitting needle 15 having the blades 18 to pass therethrough as illustrated more clearly in FIG. 3. However, this shape does not allow a pit 16 to pass therethrough without spreading the jaws as the pit is pushed against the camming surfaces 24 and 26 of the jaws 20 and 21 respectively. As the jaws 20 and 21 are separated, they force a valve 30 to open momentarily as illustrated in FIG. 2, but as soon as the pit 16 passes through the jaws the springloaded jaws 20 and 21 close the valve 30. A pneumatic line 31 is connected through the jaw 20 passes through the jaw 20 and is exhausted to atmosphere through the valve 30 when valve 30 is opened by the movement of jaw 20 or by the movement of jaw 21 moving the wire 32. Thus, as each pit 16 is removed by the needle 15 from the cherry 14 it is forced through the jaws 20 and 21 separating the jaws slightly and opening the valve 30 which generates a pneumatic pressure drop signal that a pit has passed through for that particular position for a synchronized needle and jaw combination. If a pit is not sensed, the valve 30 will not be actuated and no signal will be generated at the input of the memory circuit. This results in the actuation of a fluid nozzle 33 actuated by fluid line 34 which nozzle is held on framework 35. The nozzle 33 is actuated only after a predetermined positional delay so that the cherry not having signaled a pit will be indexed with the ejector nozzle of that particular set of jaws and will be ejected by a blast of air or water through the opening 13 against the cherry 14.

The operation of the system can be more clearly understood in connection with FIG. 4 in which the jaws 20 and 21 are illustrated as having the needle 15 passing therethrough and connected through a line 31 to a switch 36 which is actuated by pressure changes on a diaphragm which closes the contacts of an electrical switch each time a fruit pit passes through a pair of jaws 20 and 21. The switch 36 in turn develops an electrical signal with the switch contacts 37 which signal is stored in the memory bank 38. A pair of air lines is illustrated connected to switch 36 which would apply a differential pressure to each side of a diaphragm so that a pressure drop by the opening of valve 30 would only have to overcome the differential to generate a signal. It should of course be clear that a single line could also be used to generate the signal without departing from the scope of the invention. A flow control valve 39 is used to prevent the valve 36 from opening and closing too fast. The memory bank is powered by a power supply 40 which may be connected to a standard alternating current supply through an electrical plug 41. If the memory unit 38 misses a count from the switching of the switch 36, it generates a signal after a positional delay which actuates a solenoid 42 and a fluid valve 43 for the particular ejector required to eject the particular piece of fruit in which there was no pit registered as having been removed. Since the conveyor 11 of FIG. 1 moves in indexed steps, the memory 38 can actuate the eject nozzle 33 for a particular set of jaws on a predetermined number of shift indexes from the removal of the pits. Typically, this could be three index moves. The ejector nozzles are connected through the fluid lines 34.

Figure 5:
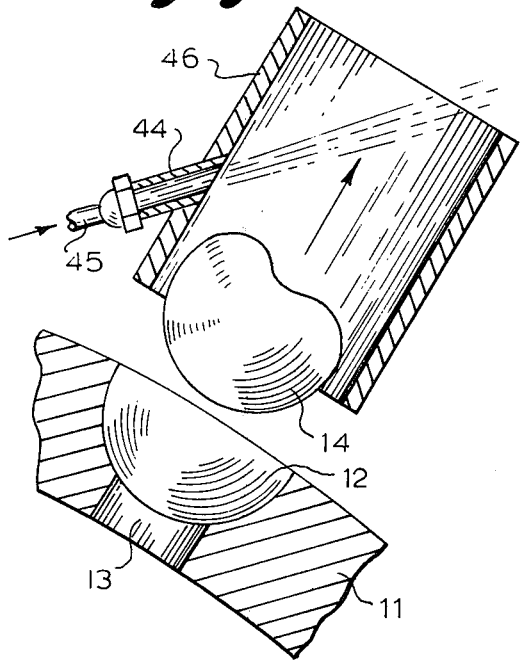
FIG. 5 is a sectional view of an ejector nozzle.
Figure 6:
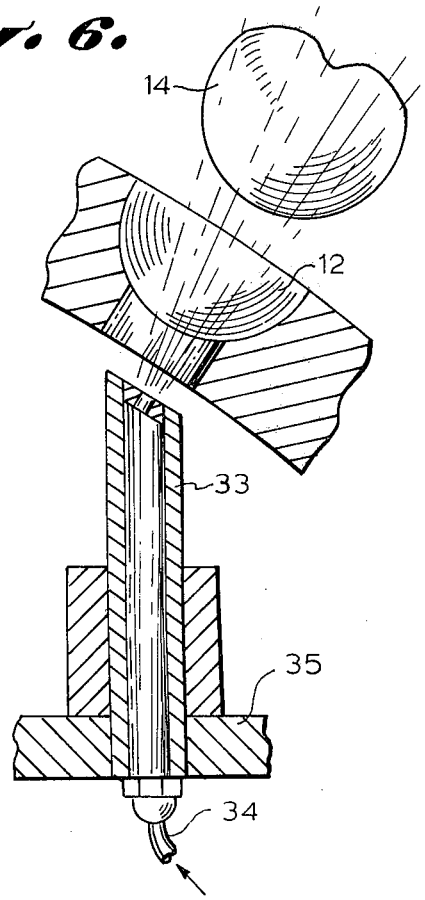
FIG. 6 is a sectional view of an ejector nozzle.

FIG. 5 and 6 more clearly illustrate the ejection of the unpitted fruit in which the ejector nozzle 33 is actuated by the fluid line 34, of FIG. 6 which blast through the opening 13 of the conveyor drum 11 driving the fruit 14 from the cup 12 while an air or water nozzle 44, FIG. 5, is connected through an air or water line 45 to a receiving pipe 46 for further blasting the cherry 14 with air or water from the nozzle 44 to drive the cherry 14 into a container from the cup 12 of the conveyor drum 11.

Figure 7:
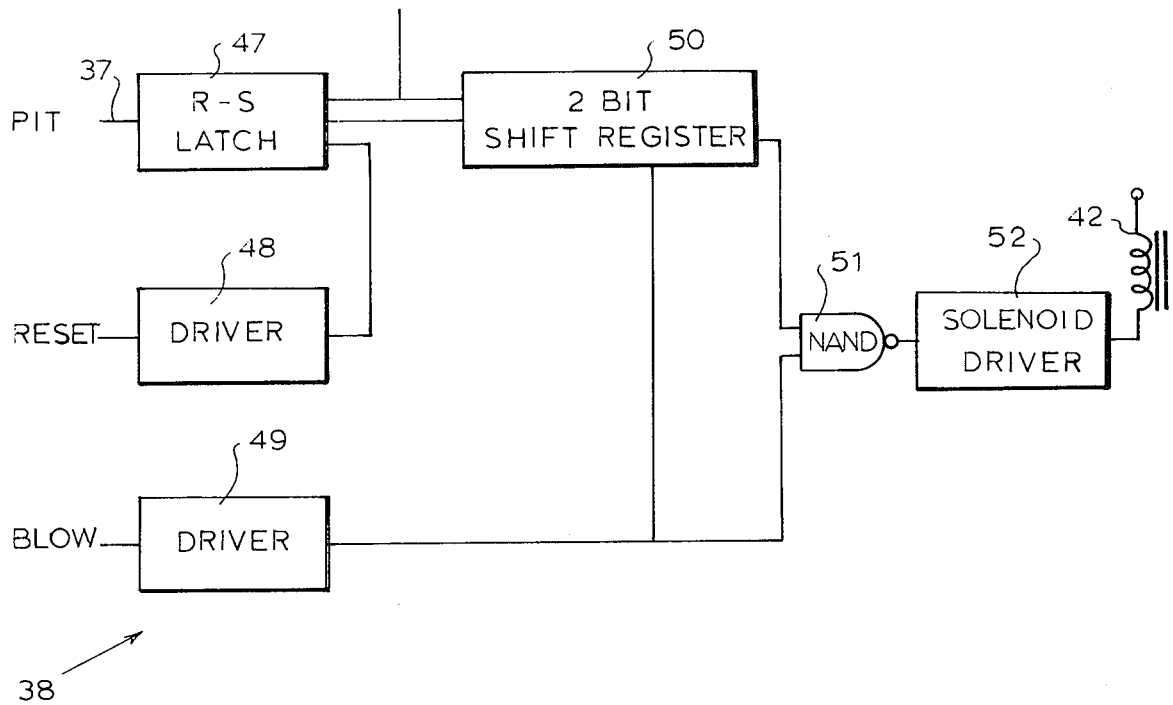
FIG. 7 is a block diagram of the electrical memory circuit.
Figure 8:
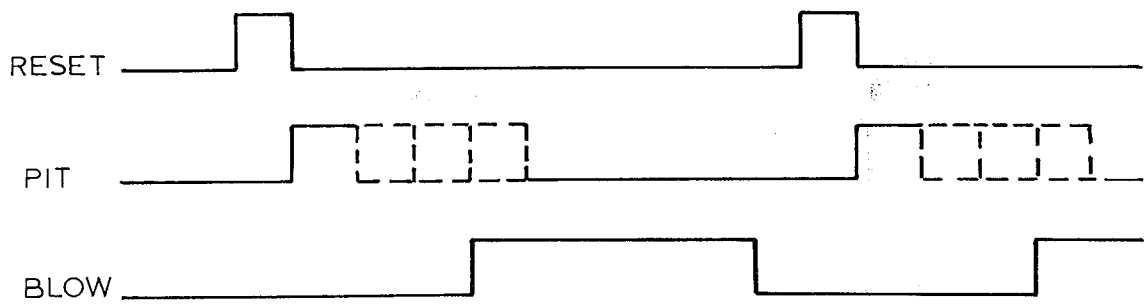
FIG. 8 is a pulse diagram.

Referring to FIGS. 7 and 8, the pit, reset and blow signals are illustrated along with the block diagram of one memory circuit. A pitting machine would have a memory circuit for each blade of the machine and might typically have 52 circuits. The blow and reset signals are generated by a cam operated lever switch which operates a microswitch each time blades 15 (FIG. 1) are actuated and thereby synchronize the signals with the actual movement of the drum 11. The pit signal is generated each time the pit jaws 30 are actuated generating a signal with switch contacts 37 of FIG. 4.

Pit and reset signals serve to operate a reset/set latch 47, which can be a pair of NAND gates, with the reset signal operated through a drive 48. The blow signal is received at the driver 49 and applied to a NAND gate 51 and is used to trigger NAND gate 51 when a pit signal is not received after a delay to drive solenoid driver 52 which may be an amplifier for driving the solenoid 42 which ejects or blows a piece of fruit from the drum 11.

The R-S latch 47 applied steering signals to the inputs of a 2-bit register 50 and is actuated by a signal from switch line 37 indicating a pit moved the jaws for the memory circuit 38. Shift register 50 applies a voltage to NAND gate 51 only after being clocked twice and NAND gate 51 drives the solenoid driver 52 to actuate solenoid 52. Only two shifts are required inasmuch as the data is transferred on the end of the preceeding blow signal while being used during a blow signal.

It should be clear at this point that a cherry pitting machine has been illustrated which utilizes a reliable mechanical and pneumatic switching to indicate when a piece of fruit has not had a pit driven therefrom and utilizes and electronic memory to actuate reliable pneumatic or water ejectors for removing unpitted pieces of fruit. It should also be clear, however, that other variations are comtemplated as being within the spirit and scope of the invention. For instance, the jaws 20 and 21 can be made of stainless steel and can have their camming surfaces shaped to fit needles of different shapes and sizes. In addition, other memory circuits can be utilized for actuating the ejectors without departing from the scope of the invention. Accordingly, this invention is not to be construed as limited to the particular forms disclosed herein since these are to be regarded as illustrative rather than restrictive.

I claim:
1. A fruit pitting machine comprising in combination:
fruit positioning support means for positioning and supporting fruit for pitting;
pitting means for removing pits from pit containing fruit supported by said fruit positioning and supporting means, said pitting means having a plurality of pitting needles each having a predetermined shape for driving a pit from the unpitted fruit;
a plurality of jaws located adjacent said pitting means, at least one said jaw associated with each pitting needle and being shaped to receive said needle and to be moved by a fruit pit being removed from a piece of fruit;
signal generating means coupled to said jaws and being actuated by movement of said jaws;
control means coupled to said generating means and actuated by movement of said jaws to generate an output control signal responsive to the absence of a fruit pit moving a jaw; and
a fruit separating means operatively connected to said control means to separate a piece of fruit upon control of said actuation means, whereby unpitted fruit is detected and separated in said fruit pitting machine.
2. A fruit pitting machine in accordance with claim 1 in which a pair of jaws is associated with each said needle, said jaws being shaped to receive said needle without moving said jaws.

3. A fruit pitting machine in accordance with claim 2 in which said signal generating means coupled to said jaws includes a pneumatic valve actuated by the movement of at least one said jaw.

4. The apparatus in accordance with claim 3 in which said jaws provide a camming surface for a fruit pit to cam the jaws apart.

5. The apparatus in accordance with claim 4 in which said jaws are mounted to shafts and are spring bias towards each other.

6. The apparatus in accordance with claim 5 in which said signal generating means pneumatic valve actuates a pneumatic-electrical switch to generate an electrical signal in said control means.

7. The apparatus in accordance with claim 6 in which said control means actuates a fluid valve which actuates said fruit separating means after a predetermined delay responsive to not receiving a predetermined signal from said generating means.

8. The apparatus in accordance with claim 7 in which said fruit separating means includes a fluid nozzle for blowing a selected piece of fruit from said pitting means.

9. A fruit pitting machine comprising:
fruit conveyor means;
pitting means for removing pits from pit containing fruit, said pitting means having a plurality of pitting needles of predetermined shape, said pitting means needles being located on one side of said fruit conveyor means for driving fruit pits through openings in said fruit conveyor means when actuated;
a plurality of pairs of movable jaws located on the other side of said fruit conveyor means, each pair of jaws being shaped to receive one needle therebetween and to be moved by the passage of a pit therebetween;
separating means for separating unpitted fruit upon command, said separating means being located adjacent said fruit conveyor means in a spaced relationship to said pitting means; and
positional delay control means coupled to each pair of jaws and to said operating means for selectively actuating said separating means upon a predetermined positional delay responsive to the absence of a pair of jaws being moved by a fruit pit, whereby unpitted fruit is separated in said fruit pitting machine.

10. The apparatus in accordance with claim 9 in which each said pitting means needle is generally star-shaped in cross section and each said pair of movable jaws are spaced and shaped to receive said generally star-shaped needle therethrough.

11. The fruit pitting machine in accordance with claim 10 in which each pair of jaws has at least one pneumatic valve actuated by the movement of said jaw and each said pneumatic valve is coupled to said positional delay control means by a pneumatic line which actuates an electrical switch generating a signal in said positional delay control means.

12. The fruit pitting machine in accordance with claim 11 in which said positional delay control means actuates a fluid valve responsive to a pair of said jaws not passing a fruit pit thereby actuating said separating means for separating unpitted fruit.

13. The apparatus in accordance with claim 12 in which said jaws each have angled camming surfaces which are pushed apart by fruit pits passing therethrough and said camming surfaces being angled towards an apex with one said jaw camming surface having a slot at the apex.

14. A fruit pitting machine comprising:
fruit positioning and supporting means for positioning and supporting fruit;
pitting means located adjacent said fruit positioning and supporting means for removing pits from pit containing fruit supported by said positioning and supporting means;
separating means located adjacent said fruit positioning and supporting means for separating unpitted fruit from pitted fruit on said positioning and supporting means;
pit actuated pneumatic valve means located adjacent said pitting means for actuating a pneumatic valve responsive to each pit removed by said pitting means;
electrical positional delay memory means coupled to and actuated by said pit actuated valve means for delaying a signal generated by said pit actuated pneumatic valve means; and
fluid switch means coupled to and actuated by said electrical, positional delay memory means responsive to the absence of a pit actuating said pneumatic valve means to actuate said separating means to separate unpitted fruit from pitted fruit.

15. The apparatus in accordance with claim 14 in which said electrical positional delay memory means includes means to delay actuating said fluid switch means a predetermined number of indexed movements of said pitting means.

* * * * *